United States Patent
Tanaya et al.

(10) Patent No.: US 7,882,730 B2
(45) Date of Patent: Feb. 8, 2011

(54) INTERNAL-COMBUSTION-ENGINE IGNITION DIAGNOSIS APPARATUS

(75) Inventors: Kimihiko Tanaya, Chiyoda-ku (JP); Yumi Takaoka, Aioi (JP); Takahiko Inada, Chiyoda-ku (JP); Takeshi Koda, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/641,019

(22) Filed: Dec. 17, 2009

(65) Prior Publication Data

US 2010/0257921 A1   Oct. 14, 2010

(30) Foreign Application Priority Data

Apr. 9, 2009   (JP)   ............................. 2009-094910

(51) Int. Cl.
  *G01M 15/00*   (2006.01)
(52) U.S. Cl. ................... 73/114.67; 73/35.08
(58) Field of Classification Search ............... 73/35.08, 73/114.67
  See application file for complete search history.

(56) References Cited

U.S. PATENT DOCUMENTS

| | | | |
|---|---|---|---|
| 6,786,200 B2 * | 9/2004 | Viele et al. ............. | 123/406.27 |
| 6,935,310 B2 * | 8/2005 | Viele et al. ............. | 123/406.27 |
| 7,062,373 B2 * | 6/2006 | Takahashi et al. ........... | 701/114 |
| 7,448,253 B2 * | 11/2008 | Asano et al. ............... | 73/35.08 |
| 7,789,595 B2 * | 9/2010 | Tanaya ........................ | 406/13 |
| 7,798,125 B2 * | 9/2010 | Barrett et al. .......... | 123/406.37 |
| 2009/0099722 A1 * | 4/2009 | Tanaya ........................ | 701/29 |

FOREIGN PATENT DOCUMENTS

JP   3507793 A   7/2003

* cited by examiner

*Primary Examiner*—Freddie Kirkland, III
(74) *Attorney, Agent, or Firm*—Sughrue Mion, PLLC (57) ABSTRACT

There is provided an ignition diagnosis apparatus that detects ignition abnormality in a multi-point-ignition internal combustion engine. An ion detection device provided in at least one of a plurality of ignition devices detects an electric quantity based on ions produced in a combustion chamber due to combustion of an inflammable fuel-air mixture; an ion occurring timing detection device detects an ion occurring timing, based on the electric quantity detected in a predetermined detection period; an ignition abnormality determination device compares the detected ion occurring timing with a comparison timing set in such a way as to be delayed in terms of the rotation angle of a crankshaft of the internal combustion engine with respect to an ignition timing set for the ignition device provided with the ion detection device, and determines that ignition performed by the ignition device provided with the ion detection device is abnormal, in the case where the ion occurring timing is delayed in terms of the rotation angle of the crankshaft with respect to the comparison timing.

11 Claims, 5 Drawing Sheets

INTERNAL-COMBUSTION-ENGINE IGNITION DIAGNOSIS APPARATUS

BACKGROUND OF THE INVENTION

1. Field of the Invention

The present invention relates to an ignition diagnosis apparatus for diagnosing a failure or an abnormality in the ignition system of an internal combustion engine.

2. Description of the Related Art

In recent years, problems of environmental conservation and fuel depletion have been raised, and also in the automobile industry, solutions to these problems have become big issues. As one of the solutions to the problems, a multi-point ignition method has been drawing attention; in the multi-point ignition method, a plurality of ignition sources is arranged in the combustion chamber of a single cylinder, and an inflammable fuel-air mixture is ignited to combust at a plurality of positions in the combustion chamber so that the thermal efficiency is raised and hence the engine efficiency is maximized.

However, the multi-point ignition method, in which the engine efficiency is raised by igniting an inflammable fuel-air mixture at a plurality of positions in an combustion chamber, has a problem, on the other hand, that a failure in part of the ignition positions makes it impossible to obtain a target engine efficiency; therefore, it is required to diagnose and appropriately deals with the failure in the ignition system.

To date, as an apparatus for diagnosing a failure or an abnormality in the ignition system of an internal combustion engine, there has been known an apparatus (for example, refer to Japanese Patent No. 3507793) in which combustion of an inflammable fuel-air mixture or extinction is detected based on whether or not there is produced an ion current obtained by applying a voltage to ions that are produced when the inflammable fuel-air mixture is combusted.

In a conventional apparatus disclosed in Japanese Patent No. 3507793, in the case of an internal combustion engine utilizing the multi-point ignition method in which a plurality of ignition sources is arranged in the combustion chamber of a single cylinder, it cannot be determined that part of the ignition sources are in a failure state, and in the case where, even though combustion does not occur in all the ignition sources provided at a plurality of positions, combustion occurs at any one of the positions in the cylinder, the combustion produces ions and hence an ion current is detected; therefore, there has been a problem that it is determined that because no extinction has occurred, i.e., ignition or lighting has normally occurred, there exists no failure or abnormality in the ignition system.

SUMMARY OF THE INVENTION

The present invention has been implemented in order to solve the foregoing problem in a conventional apparatus; the objective thereof is to provide an internal-combustion-engine ignition diagnosis apparatus that can accurately determine whether or not there exists an ignition abnormality in the internal combustion engine utilizing the multi-point ignition method, that can raise the engine efficiency, and that can contribute to solving the fuel depletion problem and to the environmental conservation.

An internal-combustion-engine ignition diagnosis apparatus according to the present invention is an ignition diagnosis apparatus for an internal combustion engine in which an inflammable fuel-air mixture taken in by a combustion chamber of a cylinder is ignited to burn by a plurality of ignition devices, the internal-combustion-engine ignition diagnosis apparatus is characterized by including an ion detection device that is provided in at least one of the plurality of ignition devices and detects an electric quantity based on an ion produced in the combustion chamber due to combustion of the inflammable fuel-air mixture; an ion occurring timing detection device that detects an ion occurring timing, based on the electric quantity detected in a predetermined detection period; and an ignition abnormality determination device that compares the detected ion occurring timing with a comparison timing set in such a way as to be delayed in terms of the rotation angle of a crankshaft of the internal combustion engine with respect to an ignition timing of the ignition device provided with the ion detection device, and determines that ignition performed by the ignition device provided with the ion detection device is abnormal, in the case where the ion occurring timing is delayed in terms of the rotation angle of the crankshaft with respect to the comparison timing.

An internal-combustion-engine ignition diagnosis apparatus according to an aspect of the present invention preferably sets the comparison timing as a relative timing to the ignition timing of the ignition device provided with the ion detection device.

An internal-combustion-engine ignition diagnosis apparatus according to another aspect of the present invention preferably sets the comparison timing based on a predetermined crank angle in accordance with an operation condition of the internal combustion engine.

In an internal-combustion-engine ignition diagnosis apparatus according to the present invention, the ion detection device preferably detects the electric quantity as an ion current that flows based on an inter-electrode voltage of an ignition plug in the ignition device provided with the ion current detection device; the ion occurring timing detection device is provided with an ion signal generation device for generating an ion signal based on the ion current detected by the ion detection device and a level comparison device for comparing the level of the ion signal in a predetermined detection period with a predetermined comparison level; in the case where, in the detection period, the level of the ion signal is continuously over the comparison level even when a predetermined time elapses after the level of the ion signal has initially become over the comparison level, the ion occurring timing detection device detects, as an ion occurring timing, the timing when the level of the ion signal has initially become over the comparison level, and in the case where, in the detection period, the level of the ion signal is continuously under the comparison level even when a predetermined time elapses after the level of the ion signal has initially become under the comparison level, the ion occurring timing detection device may detect, as an ion occurring timing, the timing when the level of the ion signal has initially become under the comparison level.

In an internal-combustion-engine ignition diagnosis apparatus according to the present invention, the level comparison device preferably switches the comparison level at the timing when the level of the ion signal becomes over the comparison level or under the comparison level.

An internal-combustion-engine ignition diagnosis apparatus according to the present invention is preferably provided with a leakage determination device for determining whether or not electric energy leaks, and the level comparison device switches the comparison level in accordance with the result of the determination performed by the leakage determination device.

In an internal-combustion-engine ignition diagnosis apparatus according to the present invention, in the case where the leakage determination device determines that the electric energy leaks, the level comparison device sets the comparison level to a larger value than when the electric energy does not leak.

An internal-combustion-engine ignition diagnosis apparatus according to the present invention is preferably provided with a leakage determination device for determining whether or not electric energy leaks, and in the case where the leakage determination device determines that the electric energy leaks, the ignition abnormality determination device does not perform the determination.

In an internal-combustion-engine ignition diagnosis apparatus according to the present invention, the leakage determination device preferably changes a threshold value for determining whether or not the electric energy leaks, in accordance with the voltage value of a battery that supplies the electric energy.

In an internal-combustion-engine ignition diagnosis apparatus according to the present invention, the ion occurring timing detection device is preferably provided with a masking device for masking the electric quantity for a predetermined time after at least one out of the ignition timings of the plurality of ignition devices, and detects the ion occurring timing, based on the electric quantity masked by the masking device.

An internal-combustion-engine ignition diagnosis apparatus according to the present invention is provided in at least one of a plurality of ignition devices and includes an ion detection device that detects an electric quantity based on an ion that occurs in a combustion chamber when a fuel-air mixture combusts; an ion occurring timing detection device that detects an ion occurring timing, based on the electric quantity detected in a predetermined detection period; and an ignition abnormality determination device that compares the detected ion occurring timing with a predetermined comparison timing and determines whether or not there exists an abnormality in ignition performed by the ignition device provided with the ion detection device, based on whether or not the ion occurring timing is delayed in terms of the rotation angle of the crankshaft with respect to the comparison timing; therefore, the internal-combustion-engine ignition diagnosis apparatus accurately determines whether or not there exists an ignition abnormality in the internal combustion engine utilizing the multi-point ignition method so as to raise the engine efficiency and contribute to solving the fuel depletion problem and to the environmental conservation.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
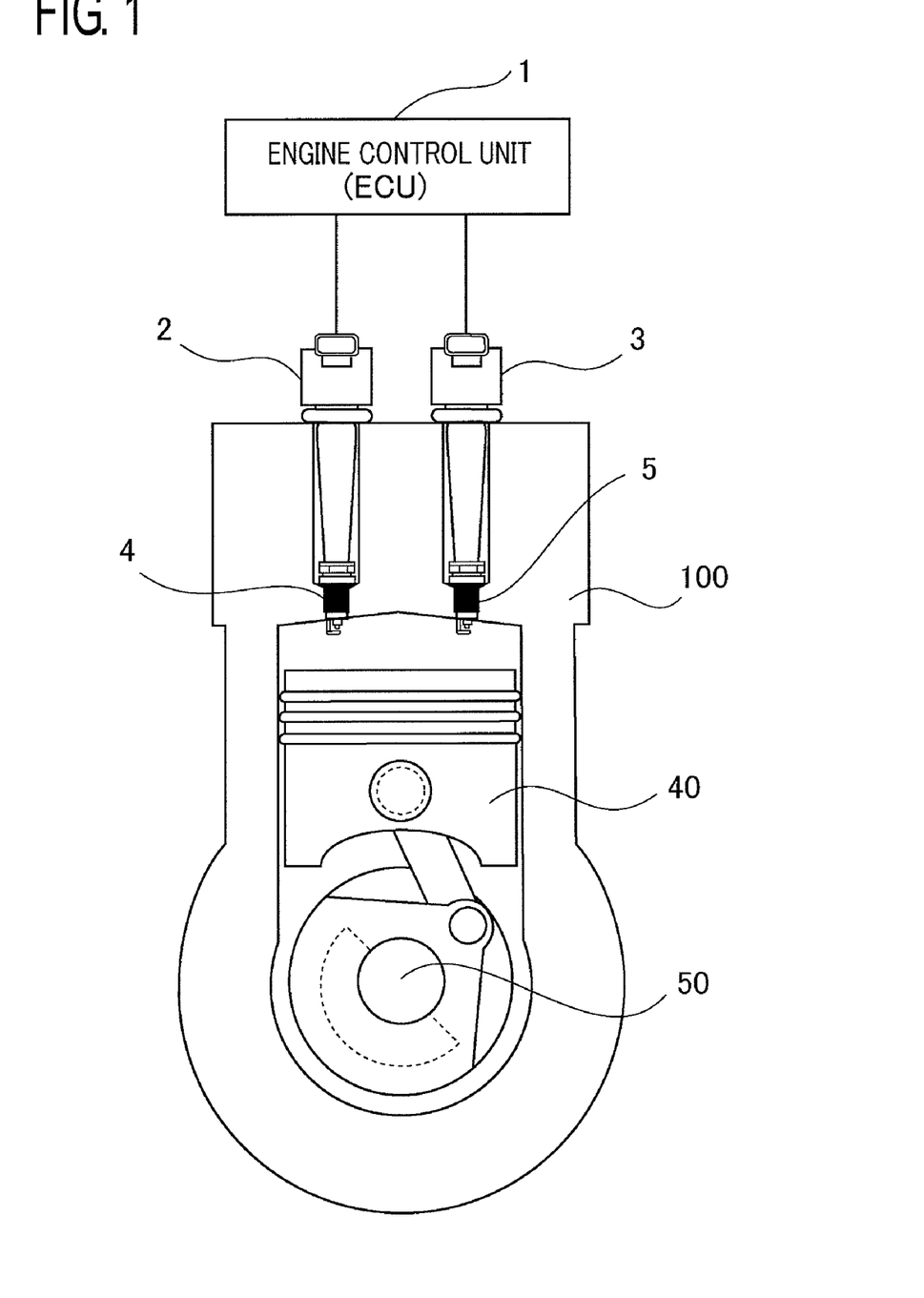
FIG. 1 is a configuration diagram illustrating the configuration of an internal combustion engine to which an internal-combustion-engine ignition diagnosis apparatus according to Embodiment 1 of the present invention is applied.
Figure 2:
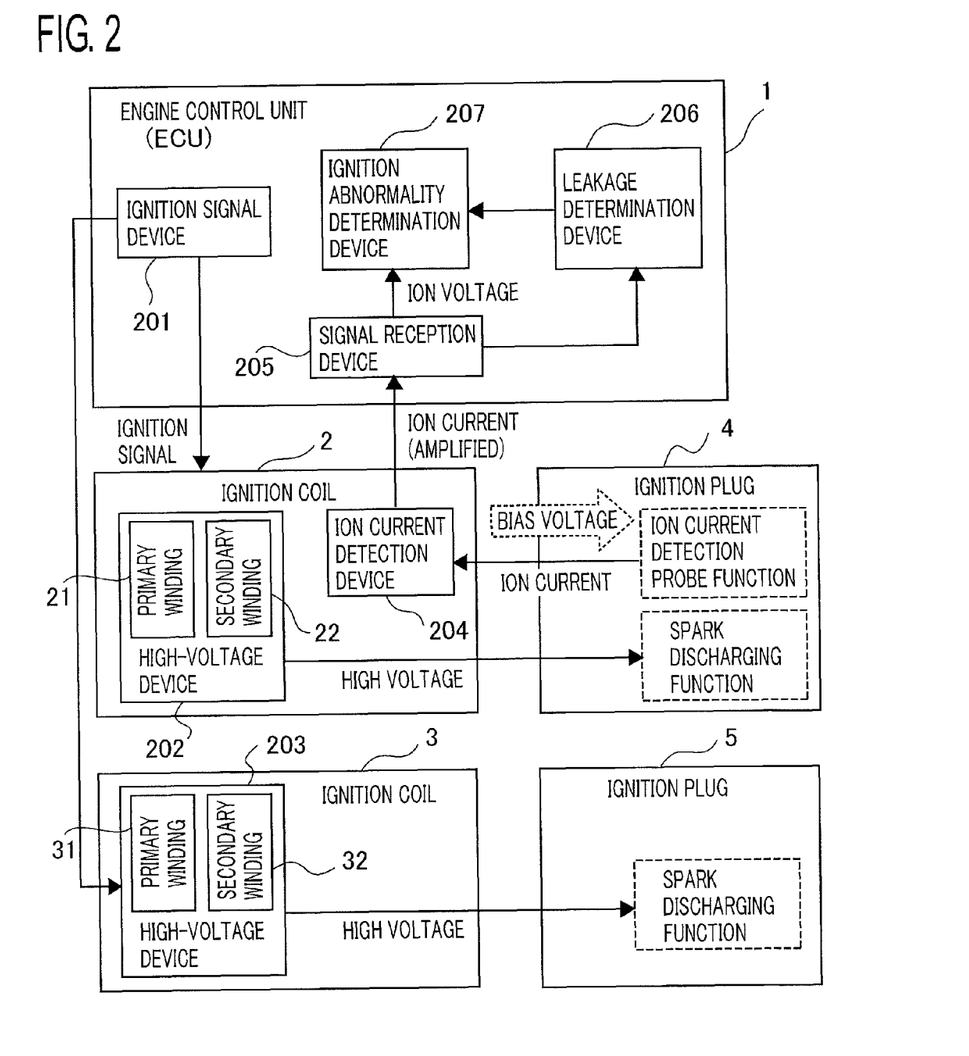
FIG. 2 is a block diagram illustrating the configuration of an internal-combustion-engine ignition diagnosis apparatus according to Embodiment 1 of the present invention.

An internal-combustion-engine ignition diagnosis apparatus according to Embodiment 1 of the present invention will be explained below. FIG. 1 is a configuration diagram illustrating the configuration of an internal combustion engine to which an internal-combustion-engine ignition diagnosis apparatus according to Embodiment 1 of the present invention is applied; FIG. 2 is a block diagram illustrating the configuration of an internal-combustion-engine ignition diagnosis apparatus according to Embodiment 1 of the present invention. In FIGS. 1 and 2, two ignition plugs 4 and 5 are provided at the top portion of a cylinder 100 of an internal combustion engine to which a multi-point ignition method is applied; inside the cylinder 100, there is contained a piston 40 coupled with a crankshaft 50.

Each of the ignition plugs 4 and 5 has a first electrode to which an ignition voltage for producing a spark discharge and a bias voltage described later are applied and a second electrode that faces the first electrode through a gap and is maintained to the ground potential; the ignition voltage is applied between these electrodes so that a spark discharge is produced and an inflammable fuel-air mixture in a combustion chamber is ignited (simply referred to as ignition, hereinafter) to burn. An ignition coil device 2 is mechanically integrated with the ignition plug 4 and provided with a primary winding 21 connected with a power source formed of a battery, a secondary winding 22 coupled with the primary winding 21 by the intermediary of a magnetic iron core, and an ion current detection device 204. A high-voltage device 202 in the ignition coil device 2 is configured with the primary winding 21 and the secondary winding 22. The ignition coil device 2 and the ignition plug 4 configure an ignition device provided with an ion detection device.

An ignition coil device 3 is mechanically integrated with the ignition plug 5 and provided with a primary winding connected with a power source formed of a battery and a secondary winding 32 coupled with the primary winding 31 by the intermediary of a magnetic iron core. A high-voltage device 203 in the ignition coil device 3 is configured with the primary winding 31 and the secondary winding 32. The ignition coil device 3 and the ignition plug 5 configure an ignition device other than the foregoing ignition device provided with an ion detection device.

An ignition signal device 201 in an engine control unit 1 (referred to as an ECU, hereinafter) outputs ignition signals at respective timings when the ignition coil device 2 and the ignition coil device 3 are activated.

When the respective ignition signals become to be a high level (referred to as H level, hereinafter), primary currents, described later, flow in the primary windings 21 and 31 in the corresponding ignition coil devices 2 and 3, and hence the ignition coil devices 2 and 3 start to accumulate energy; at the respective ignition timings when the ignition signals turn from H level to a low level (referred to as L level, hereinafter), high voltages are produced across the secondary windings 22 and 32. The high voltage generated across the secondary winding 22 (32) of the ignition coil device 2 (3) is conveyed to the first electrode of the ignition plug 4 (5); a spark discharge is produced through a dielectric breakdown between the first electrode and the second electrode; and there is caused combustion of the inflammable fuel-air mixture in the combustion chamber of the cylinder 100.

Due to the spark discharging operation of the ignition plugs 4 and 5, the ion current detection device 204 provided in the ignition coil device 2 generates a bias voltage as electric energy for detecting ions produced through combustion of the inflammable fuel-air mixture in the combustion chamber, for example, a constant voltage of approximately 400 V, and supplies the bias voltage to the ignition plug 4 after the ignition plug 4 completes the spark discharging operation. The bias voltage is generated based on the supply voltage from the battery (unillustrated) and applied across the electrodes of the ignition plug 4.

The ignition plug 4 has a function as an ion current detection probe in addition to the spark discharging function; when the foregoing bias voltage is applied across the first electrode and the second electrode of the ignition plug 4, there is produced an ion current as an electric quantity based on ions that are generated due to combustion of the inflammable fuel-air mixture.

The ion current generated through the bias voltage applied across the electrodes of the ignition plug 4 is detected and amplified by the ion current detection device 204 provided in the ignition coil device 2 and then is transferred to a signal reception device 205 in the ECU 1.

The signal reception device 205 converts the received ion current into an ion signal in the form of a voltage that can be processed by a microcomputer. The ion signal is transferred to a leakage determination device 206 and then to an ignition abnormality determination device 207.

The leakage determination device 206 determines whether or not there exists a leakage current that flows in a current leakage path between the first electrode and the second electrode of the ignition plug 4, based on the ion current that has been transferred thereto, and inputs the determination result, as a leakage detection signal, to the ignition abnormality determination device 207. Based on the ion signal transferred from the signal reception device 205 and the leakage detection signal from the leakage determination device 206, the ignition abnormality determination device 207 determines whether or not ignition and combustion of the inflammable fuel-air mixture has normally been performed through spark discharging operation.

Figure 3:
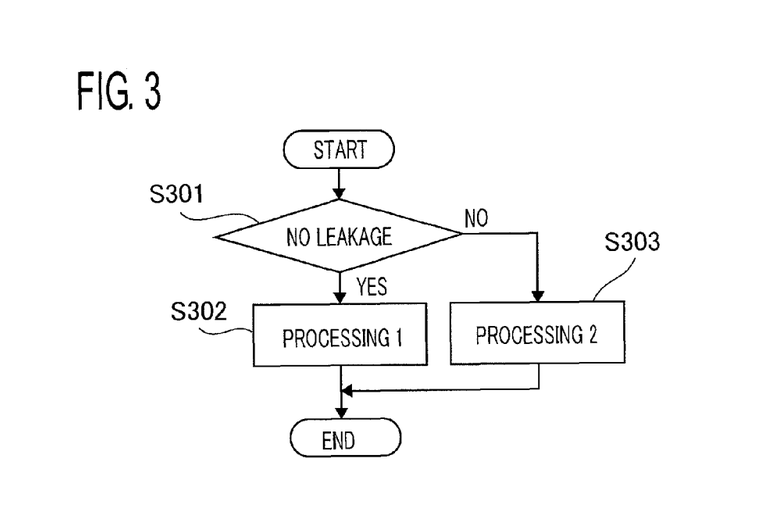
FIG. 3 is a flowchart representing the operation of an internal-combustion-engine ignition diagnosis apparatus according to Embodiment 1 of the present invention.

FIG. 3 is a flowchart representing the operation of an internal-combustion-engine ignition diagnosis apparatus, configured as described above, according to Embodiment 1 of the present invention. In FIG. 3, it is determined in the step S301 whether or not there exists a leakage current that flows in the current leakage path between the first and second electrodes of the ignition plug 4. As a result, in the case where it is determined that there exists no leakage current (YES), the step S301 is followed by the step S302; in the case where it is determined that there exists a leakage current (NO), the step S301 is followed by the step S303. In other words, in accordance with whether or not there exists a leakage current, the processing content is switched between ignition diagnosis processing 1 performed in the step S302 and ignition diagnosis processing 2 performed in the step S303. The ignition diagnosis processing 1 performed in the step S302 and the ignition determination processing 2 performed in the step S303 will be described later.

Figure 4:
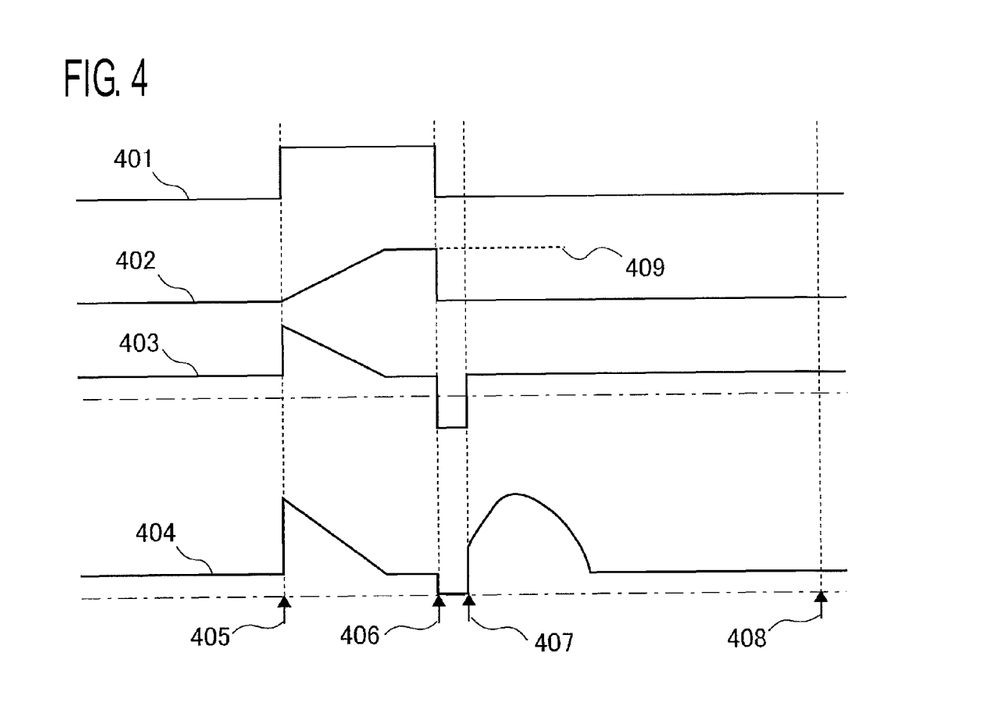
FIG. 4 is a timing chart representing the leakage diagnosis operation of an internal-combustion-engine ignition diagnosis apparatus according to Embodiment 1 of the present invention.

Next, the details of the leakage diagnosis operation in the step S301 will be explained. FIG. 4 is a timing chart representing the leakage diagnosis operation of an internal-combustion-engine ignition diagnosis apparatus according to Embodiment 1 of the present invention; the abscissa denotes the crank angle or the time. In FIG. 4, reference numeral 401 denotes an ignition signal for activating the ignition coil device 2 in which the ion current detection device 204 is mounted; reference numeral 402 denotes a primary current that flows in the primary winding 21 of the ignition coil device 2; reference numeral 403 denotes an inter-electrode voltage between the first and second electrodes of the ignition plug 4; reference numeral 404 denotes an ion signal represented as a voltage value corresponding to a current detected between the electrodes of the ignition plug 4.

As is well known, a four-stroke internal combustion engine repeats the cycle consisting of a compression stroke for compressing an inflammable fuel-air mixture in the combustion chamber of the cylinder 100, a power stroke for combusting the compressed fuel-air mixture, an exhaust stroke for exhausting the burnt gas, and an intake stroke for taking in the fuel-air mixture. The respective strokes correspond to predetermined angle ranges in a crank angle range from 0°CA to 720°CA, which is the rotation angle range of the crankshaft 50 coupled with the piston 40 that reciprocates within the combustion chamber.

During the compression stroke, when the ignition signal 401 rises from L level to H level at the timing 405, the primary current 402 starts to flow as represented in FIG. 4, and energy is accumulated; the primary current 402 reaches a current limit value 409 at a predetermined timing and maintains the current limit value 409. At the timing 405 when the primary current 402 starts to increase gradually, a secondary voltage having a peak value of approximately 1 KV is induced across the secondary winding 22 of the ignition coil device 2; therefore, the inter-electrode voltage 403 of the ignition plug 4 instantaneously increases at the timing 405. After that, the value of the inter-electrode voltage 403 gradually decreases and becomes approximately equal to the value of the bias voltage at a predetermined timing.

At the timing 406, which is a timing in the final stage of the compression stroke, e.g., a timing corresponding to a crank angle of approximately −10°CA, the ignition signal 401 changes from H level to L level, and hence the primary current 402 that has been flowing in the primary winging 21 is interrupted. Accordingly, a high voltage of, for example, approximately 20 KV is induced across the primary winding 22, whereby the value of the inter-electrode voltage 403 of the ignition plug 4 becomes equal to an ignition voltage, which is a negative high voltage, at the timing 406. As a result, at the timing 406, a spark discharge is produced between the first and second electrodes of the ignition plug 4, and then the spark discharge ends at the timing 407.

The inflammable fuel-air mixture in the combustion chamber is ignited to burn through the spark discharge at the ignition plug 4 at a timing immediately before the timing when the crank angle is 0°CA, which corresponds to the top dead center of the piston 40, whereupon the internal combustion engine moves into the power stroke. After the timing 407 when the ignition discharge ends, the value of the inter-electrode voltage 403 of the ignition plug 4 becomes equal to the value of the bias voltage.

Ions produced in the combustion chamber through combustion of the inflammable fuel-air mixture start to flow as an ion current at the timing 407, due to the inter-electrode voltage 403 based on the bias voltage applied across the electrodes of the ignition plug 4. The ion current once increases from the timing 407 and gradually decreases, and then becomes approximately zero at the timing when transition is made from the power stroke to the exhaust stroke. As described above, the ion current is detected and amplified by the ion current detection device 204 and inputted to the signal reception device 205 in the ECU 1. The signal reception device 205 converts the inputted ion current into the ion signal 404 in the form of a voltage and outputs the voltage.

As represented in FIG. 4, the ion signal 404 has a waveform corresponding to the ion current that starts to flow at the timing 407; after the timing when the ion current disappears, the value of the ion signal 404 becomes a value corresponding to a leakage current that flows in the current leakage path between the electrodes of the ignition plug 4, based on the bias voltage. During the time period between the timing 405 when the ignition signal 401 becomes H level and the timing 406 when the ignition signal 401 becomes L level, a leakage current flows in the current leakage path between the electrodes of the ignition plug 4, based on the value of the inter-electrode voltage 403 of the ignition plug 4; thus, the ion signal 404 has a waveform represented in FIG. 4.

The timing 408 in FIG. 4 is an ending timing when a timing period, in which the leakage determination device 206 detects the ion signal 404, ends. In Embodiment 1, the ending timing 408 is set in the second half of the power stroke of the internal combustion engine, i.e., in the crank angle range from 90°CA after the top dead center of the piston 40 to 180°CA, the bottom dead center.

The leakage determination device 206 determines whether or not there exists a leakage current that flows in the current leakage path between the first electrode and the second electrode of the ignition plug 4, based on the minimum value of the ion signal 404, represented in FIG. 4, during the time period from the timing 405 and the timing 408. However, the ion signal 404 is masked during the time period between approximately 100 µs and approximately 1000 µs after the timing 405 when noise is superimposed on the ion signal 404, during the time period, which is a spark discharging period and corresponds to the dead band of the ion detection, from the timing 406 to the timing 407, and during the time period between approximately 100 µs and approximately 1000 µs after the timing 407 when noise is superimposed on the ion signal 407; these time periods are removed from the time period in which the minimum value of the ion signal 404 is obtained.

The leakage determination device 206 converts the minimum value of the ion signal 404 into the value of an insulating resistance between the electrodes of the ignition plug 4; in the case where the resistance value is the same as or smaller than, for example, 25 MΩ, it is determined that a leakage current flows in the current leakage path between the first and second electrodes of the ignition plug 4, i.e., that there exists leakage. The determination threshold value per se is not particularly important but can arbitrarily be altered.

In order to convert the minimum value of the ion signal 404 into a value corresponding to an insulating resistance value, there is required a voltage value V2 of a voltage, like the inter-electrode voltage 403 represented in FIG. 4, applied across the electrodes of the ignition plug 4. Thus, in Embodiment 1, the inter-electrode voltage 404 at the timing when the minimum value of the ion signal 404 is obtained is utilized as the voltage value V2; the insulating resistance value is obtained by dividing the voltage value V2 by the minimum value of the ion signal 404.

The voltage value V2 may be received by the ECU 1 directly from the ignition coil device 2, or the voltage to be applied across the electrodes of the ignition plug 4 may be estimated as a function of the battery voltage and the time from the energization start or as a map value. In this situation, as represented in FIG. 4, by clipping the primary current 402 of the ignition coil device 2 with the current limit value 409 so as to suppress the primary current 402 from changing, the known voltage to be applied, i.e., the bias voltage can be made unsusceptible to the induced voltage, even when there is applied the primary current 402 that causes a large change in the voltage value V2, which is the inter-electrode voltage of the ignition plug 4; therefore, the voltage value V2 can readily be estimated.

In the above explanation, an ion current is transferred from the ignition coil device 2 to the ECU 1; however, an ionization resistance value corresponding to an insulating resistance value may be transferred to the ECU 1; the ionization resistance value is obtained in the ignition coil device 2 by dividing the ion current by the inter-electrode voltage 403.

Furthermore, in the foregoing explanation, the determination on whether or not there exists leakage is performed based on a value corresponding to the insulating resistance value; however, it may simply be determined that there exists leakage, in the case where the minimum value of the ion signal 404 is the same as or larger than a predetermined value, for example, 4 µA.

Figure 5:
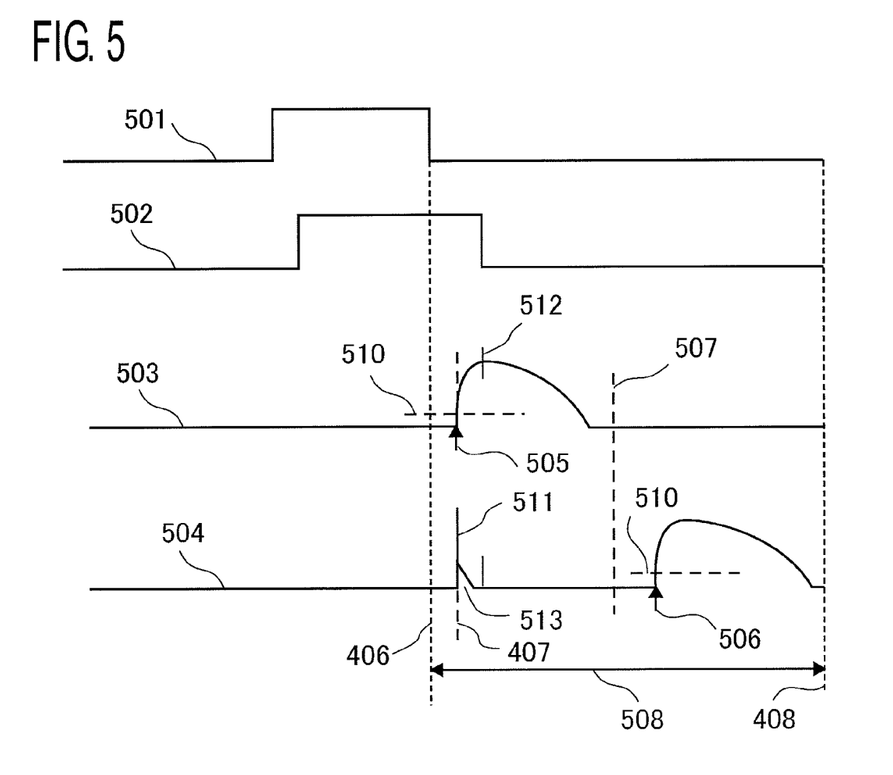
FIG. 5 is a timing chart representing the ignition diagnosis operation of an internal-combustion-engine ignition diagnosis apparatus according to Embodiment 1 of the present invention in the case where there exists no leakage.

In such a manner as described above, the leakage determination device 206 determines whether or not there exists leakage. In the case where it is determined in the step S301 in FIG. 3 that there exists no leakage (YES), the step S301 is followed by the step S302, where the ignition diagnosis processing 1 is performed. FIG. 5 is a timing chart representing the ignition diagnosis operation of an internal-combustion-engine ignition diagnosis apparatus according to Embodiment 1 of the present invention in the case where there exists no leakage; FIG. 5 represents a case where no leakage occurs across the electrodes of the ignition plug 4. The abscissa in FIG. 5 denotes the crank angle or the time.

In FIG. 5, reference numeral 501 denotes an ignition signal for activating the ignition coil device 2 in which the ion current detection device 204 is mounted; reference numeral 502 denotes an ignition signal for activating the ignition coil device 3; reference numeral 503 denotes an ion signal in the case where normal ignition is performed by the ignition 4 with which the ignition coil device 2 is connected; and reference numeral 504 denotes an ion signal in the case where normal ignition is not performed by the ignition plug 4 with which the ignition coil device 2 is connected, but only the ignition plug 5 with which the ignition coil device 3 is connected ignites the inflammable fuel-air mixture to cause combustion.

The ion signals 503 and 504 are each represented as a value corresponding to a current detected between the electrodes of the ignition plug 4. The timings 505 and 506 are ion occurring timings when there are produced ions which are detected based on the ion signals 503 and 504, respectively, in such a manner as described later; in other words, they are combustion detection timings when combustion is detected. Hereinafter, these ion occurring timings may be referred to as combustion detection timings.

These ion occurring timing 505 and 506 are detected as the timings when the ion signals 503 and 504 exceed respective comparison levels 510 in a predetermined detection period 508 that is set as a time between the timing 406 and the timing 408. The comparison level 510 is set to one of a first threshold value thL and a second threshold value thH that is larger than the first threshold value thL.

As explained with reference to FIG. 4, the timing 406 is an ignition timing when an ignition voltage, which is a negative high voltage, is applied across the electrodes of the ignition plug 4; the timing 408 coincides with the ending timing of the detection period 508 in which the leakage determination device 206 detects the ion signal 503 or 504.

In this situation, in some cases, noise 511 or 512 is superimposed on the ion signal 503 and 504; therefore, in order to prevent erroneous detection, of the combustion detection timings, which is caused by the noise 511 and 512 or the like, filtering processing, i.e., noise processing is applied to noise 511, for example.

Figure 6:
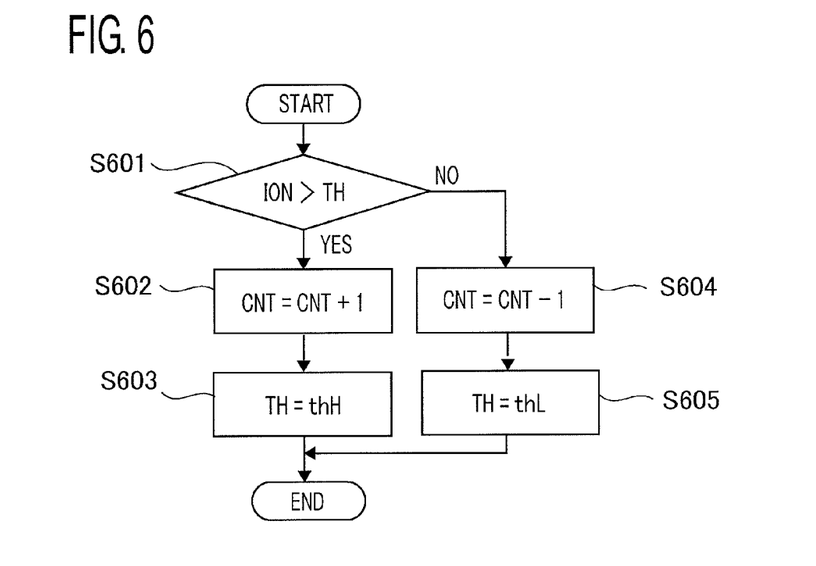
FIG. 6 is a flowchart representing the noise processing operation of an internal-combustion-engine ignition diagnosis apparatus according to Embodiment 1 of the present invention.

FIG. 6 is a flowchart representing the noise processing operation of an internal-combustion-engine ignition diagnosis apparatus according to Embodiment 1 of the present invention; FIG. 6 represents processing in the case where an ion current is dealt with as a signal based on a current. In the case where an ion signal is dealt with as a signal based on a resistance value, the signs "YES" and "NO" are required to be interchanged in the step S601 represented in FIG. 6.

In FIG. 6, in the step S601, at first, the ion signal 503 or 504 (these ion signals are referred to as ION in the explanation in FIG. 6) is compared with the comparison level 510 (referred to as TH in the explanation in FIG. 6), so that it is determined whether or not ION is larger than TH. At the beginning time of the detection period 508, TH, which is a comparison level, is set to the first threshold value thL as the initial value.

The first threshold value thL is set to a value of 2 μA to 4 μA, for example, as the value of an ion current, in the case where the bias voltage is 100 V and the ion signal is based on a current value. In the case where the ion signal is represented as an ionization resistance value based on the resistance value, the first threshold value thL is set to a value between 25 MΩ and 50 MΩ, for example.

In the case where it is determined in the step S601 that ION is larger than TH (YES), the step S601 is followed by the step S602, where the counter value CNT is increased by one unit; then, the step S602 is followed by the step S603. In the step S603, TH is switched over to the second threshold value thH that is larger than the first threshold value thL.

The second threshold value thH is set to a value of 4 μA to 10 μA, for example, as the value of an ion current, in the case where the bias voltage is 100 V and the ion signal is based on a current value. In the case where the ion signal is represented as an ionization resistance value based on the resistance value, the second threshold value thH is set to a value between 10 MΩ and 25 MΩ, for example. By applying hysteresis processing to the threshold value TH, as described above, there can be prevented erroneous detection, of an ion current, which is caused by noise 513 that occurs at the ending edge of the noise 511 represented in FIG. 5.

In the processing represented in FIG. 6, as a method of applying the hysteresis processing to TH, the threshold value is switched from the first threshold value thL to the second threshold value thH only when the ion signal firstly exceeds the comparison level 510 in the detection period 508.

As another method of applying the hysteresis processing to TH, there exists a method in which the first threshold value thL is utilized as the threshold value only in the initial period, for example, in a predetermined time between the ignition timing 406 and the time instant that is approximately 2 ms from the ignition timing 406, in the detection period 508, and after the predetermined time elapses, the threshold value is switched over to the second threshold value thH; as further another method, there exists a method in which the first threshold value thL is utilized as the threshold value only in an angle range of approximately 10°A in crank angle, and after the angle range, the threshold value is switched over to the second threshold value thH. According to these methods, there can be omitted calculation processing for switching the threshold value, and a minute ion signal that occurs in the second half of the detection period 508 can be prevented from not being detected.

Next, in FIG. 5, the noise 512 is caused by the ignition signal 502 applied to the ignition coil device 3 in which the ion current detection device 204 is not provided. The existence of the noise 512 suggests that the ignition plug 5 has actually performed ignition operation, i.e., that a dielectric breakdown has been produced across the electrodes of the ignition plug 5; however, because the noise 512 is a factor that functions as noise in determining the ion occurring timing, processing for preventing the erroneous detection caused by the noise 512 is further added.

In other words, the noise 512 occurs at the timing when the ignition signal 502 turns from H level to L level, i.e., at the timing when a primary current to the primary winding 31 of the ignition coil device 3 is shut off; therefore, the masking processing is performed in order to ignore the ion signal in a predetermined period from a timing close to the foregoing timing, for example, the timing when the ignition signal 503 turns from H level to L level to a timing that is approximately 500 μs after that timing so that the ion occurring timing is prevented from being erroneously detected due to the noise 512. The masking device for performing the masking processing is provided in the signal reception device 205 of the ECU 1, the ignition abnormality determination device 207, or the like.

In the case where, in the detection period 508, the level of the ion signal 503 (504) continuously exceeds the comparison level 510, set as a threshold value, even when a predetermined time elapses after the level of the ion signal 503 (504) has initially exceeded the comparison level 510, the ignition abnormality determination device 207 detects, as an ion occurring timing, the timing when the level of the ion signal 503 (504) has initially exceeded the comparison level 510. In the case where, in the detection period 508, the level of the ion signal 503 (504) is continuously under the comparison level 510 even when a predetermined time elapses after the level of the ion signal 503 (504) has initially become under the comparison level 510, the ignition abnormality determination device 207 may detect, as an ion occurring timing, the timing when the level of the ion signal 503 (504) has initially become under the comparison level 510.

Next, as represented in the timing chart in FIG. 6, the ignition abnormality determination device 207 is provided with a comparison timing 507 for determining ignition of the inflammable fuel-air mixture. The comparison timing 507 is set in such a way as to be delayed in terms of the rotation angle of the crankshaft 50 with respect to the ignition timing 406 in the ignition coil device in which the ion current detection device 204 is provided. Accordingly, when the ignition coil device 2 normally performs ignition, the ignition timing 406 thereof is advanced in terms of the rotation angle of the crankshaft 50 with respect to the comparison timing 507.

The ignition abnormality determination device 207 compares the comparison timing 507 with the ion occurring timing 505 detected in such a way as described above based on the ion signal 503 inputted from the signal reception device 205; in the case where the ion occurring timing 505 is delayed in terms of the rotation angle of the crankshaft 50 with respect to the comparison timing 507, the ignition abnormality determination device 207 determines that ignition by the ignition device provided with the ion current detection device 204 is abnormal. That is to say, in the case where the detected ion occurring timing 505 is advanced in terms of the rotation angle of the crankshaft 50 with respect to the comparison timing 507, the ignition abnormality determination device 207 determines that ignition has normally been performed by the ignition plug 4; in the case where the detected ion occurring timing 505 is delayed in terms of the rotation angle of the crankshaft 50 with respect to the comparison timing 507, the ignition abnormality determination device 207 determines that ignition has not normally been performed by the ignition plug 4.

For example, in the case of the ion signal 503 represented in FIG. 5, because the detected ion occurring timing 505 is advanced in terms of the rotation angle of the crankshaft 50 with respect to the comparison timing 507, the ignition abnormality determination device 207 determines that ignition has normally been performed by the ignition plug 4; in the case of the ion signal 504, because the ion occurring timing 506 is delayed in terms of the rotation angle of the crankshaft 50 with respect to the comparison timing 507, the ignition abnormality determination device 207 determines that ignition has not normally been performed by the ignition plug 4.

In this situation, the comparison timing 507 may be a crank angle to be set as a map value or table value that corresponds to at least one of conditions such as the rotation speed of an internal combustion engine, the load, the intake air temperature, and the cooling water temperature, or may be the amount of the crank angle or the time that is set as a relative position from the ignition timing 406 for the ignition plug 4 and corrected in accordance with the rotation speed or the ignition timing 406 of the internal combustion engine.

In the foregoing example, as the ion occurring timing for detecting a combustion timing, a timing when the ion signal 503 (504) exceeds the comparison level 510 is detected; however, the ion occurring timing can be detected by use of the peak timing for the ion signal 503 (504) in the detection period 508.

So far, there has been explained the contents of the ignition diagnosis processing 1 that is performed in the step S302 in the case where it is determined in the step S301 in FIG. 3 that there exists no leakage (YES).

Figure 7:
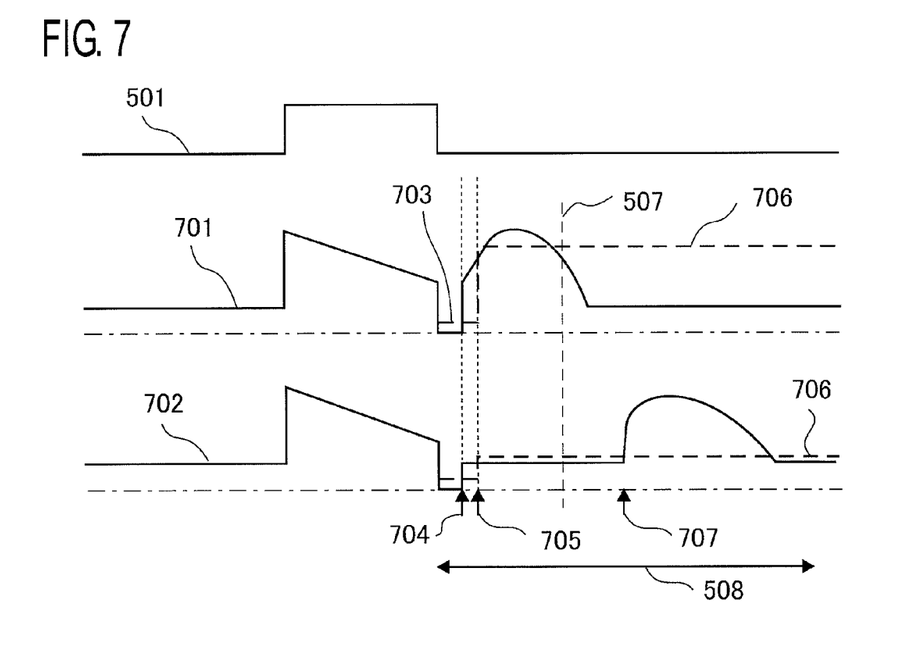
FIG. 7 is a timing chart representing the ignition diagnosis operation of an internal-combustion-engine ignition diagnosis apparatus according to Embodiment 1 of the present invention in the case where there exists leakage.

Next, there will be explained the case in which, in the case where, in the step S301 in FIG. 3, the leakage determination device 206 determines that there exists leakage (NO), the step S301 is followed by the step S303, where the ignition diagnosis processing 2 is performed. FIG. 7 is a timing chart representing the ignition diagnosis operation of an internal-combustion-engine ignition diagnosis apparatus according to Embodiment 1 of the present invention in the case where there exists leakage; FIG. 7 represents a case where leakage occurs across the electrodes of the ignition plug 4. The abscissa in FIG. 7 denotes the crank angle or the time.

The determination of ignition abnormality by the ignition abnormality determination device 207 is performed in such a way that, as is the case where there exists leakage, in the case where the ion occurring timing is advanced in terms of the rotation angle of the crankshaft 50 with respect to the comparison timing 507, the ignition abnormality determination device 207 determines that ignition has normally been performed by the ignition plug 4, and in the case where the ion occurring timing 505 is delayed in terms of the rotation angle of the crankshaft 50 with respect to the comparison timing 507, the ignition abnormality determination device 207 determines that ignition has not normally been performed by the ignition plug 4.

What is the difference between the processing 1 performed in the step S302 and the processing 2 performed in the step S303 is only the method of creating the comparison level for obtaining a combustion detection timing, i.e., an ion occurring timing; therefore, the explanation thereafter will be made mainly in terms of this point.

In FIG. 7, reference numeral 701 denotes an ion signal in the case where there exists leakage and normal ignition is performed by the ignition 4 with which the ignition coil device 2 is connected. In this case, a comparison level 706 for obtaining a combustion detection timing is set in such a way that, as a reference level, there is adopted the level of the ion signal 701 at a position close to a timing 705 that is a predetermined time after a timing 704 when the ion signal firstly exceeds an initial comparison level 703 in the detection period 508, and a predetermined offset amount, e.g., 2 µA if converted into a current, is added to the foregoing reference level.

When the comparison level is set in such a way as described above, the ion signal 701 indicates that, in the case where normal ignition is performed, the combustion detection timing is located at a timing that is slightly apart from the timing 705, and the ion signal 702 indicates that, in the case where normal ignition is not performed, the combustion detection timing is located at a timing 707; thus, by comparing the combustion detection timing with the comparison timing 507, the ignition abnormality determination device 207 can correctly diagnose ignition by the ignition plug 4, with which the ignition coil device 2 is connected, as successful or unsuccessful ignition.

Depending on the level of leakage, the setting of the comparison level 706 becomes difficult; in the case where, in accordance with the level of leakage, a value represented in insulating resistance is smaller than 5 MΩ, the diagnosis of ignition is prohibited, so that erroneous diagnosis can be prevented.

The foregoing internal-combustion-engine ignition diagnosis apparatus according to Embodiment 1 of the present invention can demonstrate the following effects:

(1) In the case where the comparison timing is set as a relative timing to the ignition timing of the ignition device provided with an ion current detection device, there can be reduced the matching man-hour for matching the crank angle or the like with the comparison timing.

(2) In the case where the comparison timing is set based on a predetermined crank angle in accordance with the operating condition of an internal combustion engine, the comparison timing can more specifically be set.

(3) The ion detection device detects the foregoing electric quantity as an ion current that flows based on an inter-electrode voltage of the ignition plug in the ignition device provided with the ion current detection device; an ion occurring timing detection device is provided with an ion signal generation device for generating an ion signal based on the ion current detected by the ion detection device and a level comparison device for comparing the level of the ion signal in a predetermined detection period with a predetermined comparison level; in the case where, in the detection period, the level of the ion signal is continuously over the comparison level even when a predetermined time elapses after the level of the ion signal has initially become over the comparison level, the ion occurring timing detection device may detect, as an ion occurring timing, the timing when the level of the ion signal has initially become over the comparison level, and in the case where, in the detection period, the level of the ion signal is continuously under the comparison level even when a predetermined time elapses after the level of the ion signal has initially become under the comparison level, the ion occurring timing detection device may detect, as an ion occurring timing, the timing when the level of the ion signal has initially become under the comparison level; therefore, the ion occurring timing can readily be detected.

(4) The level comparison device switches the comparison level at the timing when the level of the ion signal becomes over the comparison level or under the comparison level; therefore, the ion occurring timing can be prevented from being erroneously detected.

(5) There is provided a leakage determination device for determining whether or not electric energy applied across the electrodes of an ignition plug leaks, and the level comparison device switches the comparison level in accordance with the result of the determination performed by the leakage determination device; therefore, the ion occurring timing can be prevented from being erroneously detected.

(6) In the case where the leakage determination device determines that the electric energy applied across the electrodes of an ignition plug leaks, the level comparison device sets the comparison level to a larger value than when the electric energy does not leak; therefore, the ion occurring timing can be prevented from being erroneously detected.

(7) In the case where the leakage determination device determines that the electric energy leaks, the ignition abnormality determination device does not perform the determination; therefore, erroneous diagnosis about an ignition abnormality can be prevented.

(8) The leakage determination device changes a threshold value for determining whether or not the electric energy leaks, in accordance with the voltage value of a battery that supplies the electric energy; therefore, the ion occurring timing can be prevented from being erroneously detected.

(9) The ion occurring timing detection device is provided with a masking device for masking the electric quantity for a predetermined time after at least one out of the ignition timings of the plurality of ignition devices, and detects the ion occurring timing, based on the electric quantity masked by the masking device; therefore, the ion occurring timing can be prevented from being erroneously detected.

Various modifications and alterations of this invention will be apparent to those skilled in the art without departing from the scope and spirit of this invention, and it should be understood that this is not limited to the illustrative embodiments set forth herein.

What is claimed is:

1. An ignition diagnosis apparatus for an internal combustion engine in which an inflammable fuel-air mixture taken in by a combustion chamber of a cylinder is ignited to burn by a plurality of ignition devices, the internal-combustion-engine ignition diagnosis apparatus comprising:
an ion detection device that is provided in at least one of the plurality of ignition devices and detects an electric quantity based on an ion produced in the combustion chamber due to combustion of the inflammable fuel-air mixture;
an ion occurring timing detection device that detects an ion occurring timing, based on the electric quantity detected in a predetermined detection period; and
an ignition abnormality determination device that compares the detected ion occurring timing with a comparison timing set in such a way as to be delayed in terms of the rotation angle of a crankshaft of the internal combustion engine with respect to an ignition timing set for the ignition device provided with the ion detection device, and determines that ignition performed by the ignition device provided with the ion detection device is abnormal, in the case where the ion occurring timing is delayed in terms of the rotation angle of the crankshaft with respect to the comparison timing.

2. The internal-combustion-engine ignition diagnosis apparatus according to claim 1, wherein the comparison timing is set as a relative timing to the ignition timing of the ignition device provided with the ion detection device.

3. The internal-combustion-engine ignition diagnosis apparatus according to claim 1, wherein the comparison timing is set based on a predetermined crank angle in accordance with an operation condition of the internal combustion engine.

4. The internal-combustion-engine ignition diagnosis apparatus according to claim 1, wherein the ion detection device detects the electric quantity as an ion current that flows based on an inter-electrode voltage of an ignition plug in the ignition device provided with the ion current detection device; the ion occurring timing detection device is provided with an ion signal generation device for generating an ion signal based on the ion current detected by the ion detection device and a level comparison device for comparing the level of the ion signal in a predetermined detection period with a predetermined comparison level; in the case where, in the detection period, the level of the ion signal is continuously over the comparison level even when a predetermined time elapses after the level of the ion signal has initially become over the comparison level, the ion occurring timing detection device detects, as an ion occurring timing, the timing when the level of the ion signal has initially become over the comparison level, and in the case where, in the detection period, the level of the ion signal is continuously under the comparison level even when a predetermined time elapses after the level of the ion signal has initially become under the comparison level, the ion occurring timing detection device detects, as an ion occurring timing, the timing when the level of the ion signal has initially become under the comparison level.

5. The internal-combustion-engine ignition diagnosis apparatus according to claim 4, wherein the level comparison device switches the comparison level at the timing when the level of the ion signal becomes over the comparison level or under the comparison level.

6. The internal-combustion-engine ignition diagnosis apparatus according to claim 4, wherein there is provided a leakage determination device for determining whether or not electric energy leaks, and the level comparison device switches the comparison level in accordance with the result of the determination performed by the leakage determination device.

7. The internal-combustion-engine ignition diagnosis apparatus according to claim 6, wherein, in the case where the leakage determination device determines that the electric energy leaks, the level comparison device sets the comparison level to a larger value than when the electric energy does not leak.

8. The internal-combustion-engine ignition diagnosis apparatus according to claim 6, wherein the leakage determination device changes a threshold value for determining whether or not the electric energy leaks, in accordance with the voltage value of a battery that supplies the electric energy.

9. The internal-combustion-engine ignition diagnosis apparatus according to claim 1, wherein there is provided a leakage determination device for determining whether or not electric energy leaks, and in the case where the leakage determination device determines that the electric energy leaks, the ignition abnormality determination device does not perform the determination.

10. The internal-combustion-engine ignition diagnosis apparatus according to claim 9, wherein the leakage determination device changes a threshold value for determining whether or not the electric energy leaks, in accordance with the voltage value of a battery that supplies the electric energy.

11. The internal-combustion-engine ignition diagnosis apparatus according to claim 1, wherein the ion occurring timing detection device is provided with a masking device for masking the electric quantity for a predetermined time after at least one out of the ignition timings of the plurality of ignition devices, and detects an ion occurring timing, based on an electric quantity other than the electric quantity masked by the masking device.

* * * * *